US007978097B2

(12) United States Patent
Arenburg et al.

(10) Patent No.: US 7,978,097 B2
(45) Date of Patent: Jul. 12, 2011

(54) DYNAMIC SPEED LIMIT SYSTEM

(75) Inventors: Robert Thomas Arenburg, Round Rock, TX (US); Franck Barillaud, Austin, TX (US); Bradford Lee Cobb, Cedar Park, TX (US); Shivnath Dutta, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 889 days.

(21) Appl. No.: 11/949,119

(22) Filed: Dec. 3, 2007

(65) Prior Publication Data

US 2009/0140882 A1 Jun. 4, 2009

(51) Int. Cl.

| | |
|---|---|
| ***G08G 1/09*** | (2006.01) |
| ***G08G 1/01*** | (2006.01) |
| ***G08B 1/08*** | (2006.01) |
| ***G08B 21/00*** | (2006.01) |
| ***G06F 1/00*** | (2006.01) |

(52) U.S. Cl. ........ 340/936; 340/905; 340/907; 340/933; 340/934; 340/941; 340/917; 340/572.1; 340/539.11; 340/686.6; 701/117

(58) Field of Classification Search ........................ None
See application file for complete search history.

(56) References Cited

U.S. PATENT DOCUMENTS

| | | | | |
|---|---|---|---|---|
| 6,900,731 | B2 | 5/2005 | Kreiner et al. | 340/572.1 |
| 7,042,345 | B2 | 5/2006 | Ellis | 340/436 |
| 2003/0191577 | A1 * | 10/2003 | Decaux | 701/117 |
| 2006/0181433 | A1 * | 8/2006 | Wolterman | 340/917 |
| 2006/0232406 | A1 * | 10/2006 | Filibeck | 340/572.1 |
| 2007/0152847 | A1 * | 7/2007 | Quintos | 340/936 |
| 2008/0162027 | A1 * | 7/2008 | Murphy et al. | 701/117 |

* cited by examiner

*Primary Examiner* — Julie Lieu

(74) *Attorney, Agent, or Firm* — David A. Mims, Jr.; Robert V. Wilder

(57) ABSTRACT

A method, medium and implementing processing system are provided in which the presence of workers in a long highway construction zone is monitored and the electronically-controlled posted speed limit is adjusted in accordance with the detected presence of workers in the immediate area. In an example, Radio Frequency Identification (RFID) scanners or readers are strategically placed in a construction or working area. Such RFID reading devices may be embedded, for example, in construction speed limit signs. The displayed speed limit is controlled by the detected proximity of construction workers wearing RFID-embedded clothing, for example, such as safety vests or helmets. The speed limit sign includes logic to display one of many possible speed limit displays based on the nearest, and/or the number of RFID signals detected in a given area. Vehicular traffic is thereby enabled to travel faster through construction zones where no workers are present and, when appropriate, traffic is slowed when workers are present within a given proximity of the RFID reading devices.

17 Claims, 4 Drawing Sheets

DYNAMIC SPEED LIMIT SYSTEM

FIELD OF THE INVENTION

The present invention relates generally to information processing systems and more particularly to a methodology and implementation for adjusting posted speed limits based upon the presence of workers in a predetermined area.

BACKGROUND OF THE INVENTION

Driving through long construction zones with reduced speed limits is frustrating particularly when no construction workers are in the immediate vicinity. This type of scenario is particularly true for highway construction where the zones are often miles long. Typically the workers are isolated on a given part of the highway and yet the speed limit is needlessly enforced for the entire construction zone. Construction zones would be less frustrating for travelers if the traveler would be permitted to travel at more appropriate speeds when workers are not present in the immediate area.

Thus there is a need for an improved methodology and implementing system which enables an automatic or dynamic adjustment of a posted highway speed limit depending upon the detected presence of highway construction workers.

SUMMARY OF THE INVENTION

A method, medium and implementing processing system are provided in which the presence of workers in a long highway construction zone is monitored and the electronically-controlled posted speed limit is adjusted in accordance with the detected presence of workers in the immediate area. In an example, Radio Frequency Identification (RFID) scanners or readers are strategically placed in a construction or working area. Such RFID reading devices may be embedded, for example, in construction speed limit signs. The displayed speed limit is controlled by the detected proximity of construction workers wearing RFID-embedded clothing, for example, such as safety vests or helmets. The speed limit sign includes logic to display one of many possible speed limit displays based on the nearest, and/or the number of RFID signals detected in a given area. Vehicular traffic is thereby enabled to travel faster through construction zones where no workers are present and, when appropriate, traffic is slowed when workers are present within a given proximity of the RFID reading devices.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

The various methods discussed herein may be implemented, within a video broadcast system which may include, inter alia, transmission encoding and user de-coding processing systems, a transmission and receiving system, and a user system which may include, inter alia, a user processing device, memory, memory controller and storage and display means. Since the individual components of a transmission and receiving system which may be used to implement the functions used in practicing the present invention are generally known in the art and composed of electronic components and circuits which are also generally known to those skilled in the art, circuit details beyond those shown are not specified to any greater extent than that considered necessary as illustrated, for the understanding and appreciation of the underlying concepts of the present invention and in order not to obfuscate or distract from the teachings of the present invention. Although the invention is illustrated in the context of a television broadcasting and receiving system, it is understood that the principles of the invention may be implemented in any of many available and future broadcast and communication devices and systems, including but not limited to personal reception devices, hand-held personal computer devices and cell phone and other wireless communication devices which may be implemented with RFID or similar presence-detection devices or systems.

Figure 2:
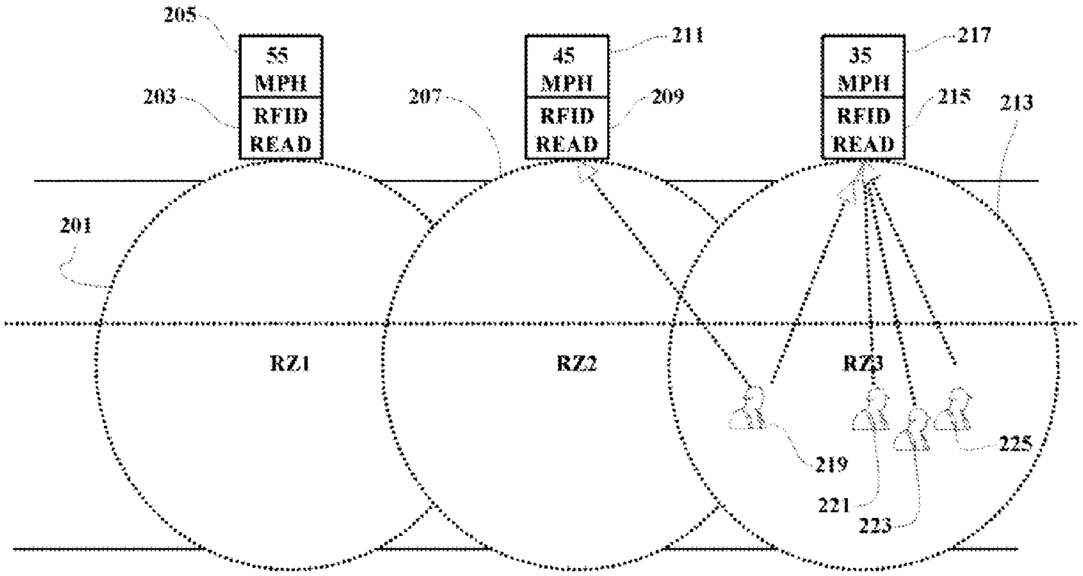
FIG. 2 is an illustration showing exemplary detection zone coverage of an area under construction.

In an exemplary embodiment, RFID readers are positioned along the construction/roadway so that the reading areas of the readers overlap such as illustrated in FIG. 2. In the example illustrated, the RFID readers are included within speed limit signs although it is understood that the RFID readers may also be placed in construction zone "cones" or even embedded into the road surface from which worker or individual presence information may be acquired and transmitted to a system for controlling speed limit displays which are visible to motorists traveling along the construction area. By placing the RFID readers with overlapping reading areas the entire area of construction may be covered providing an overlap from one RFID reader to the next. When positioned in this fashion a car traveling along the road near RZ1 may see one speed limit while another car along the same construction path but near RZ3 may see an entirely different speed limited based upon the RFID signals being read by the RFID detectors in the speed limit signs in the driver's particular area of travel. Construction workers are required to wear brightly colored safety vests and helmets while present in the construction area. Embedding RFID devices into the vest and/or helmet provides information for the RFID readers that a worker is within a given range of the reader. Additionally, by putting multiple RFID readers at the same location with different range capabilities, more detailed positional information can be acquired and used to change the speed limit as well.

In the disclosed example, one reader is arranged to control only one speed limit sign with the capability of displaying different speed limits such as an electronically-controlled speed limit display. If an RFID reader is able to read a construction worker's RFID tag, then the maximum speed limit is 35 mph. If a second RFID reader can read a construction worker's RFID and the first RFID reader cannot, then the maximum speed for the first area is increased to a predetermined higher speed limit such as 45 or 55 MPH. This could be further extended such that if neither a first or second RFID reader is picking up or detecting any construction worker's RFID tag, then a 3rd speed limit, for example 65 MPH, may be displayed on the speed limit signs in the zones covered by the first and second RFID readers.

In another example, the number of different RFID signals detected for a given zone will determine the displayed speed limit, i.e. for a given zone, if less than a predetermined number of RFID signals are read, then the displayed speed limit is a first speed limit while if the number of detected RFID signals is greater than the predetermined number then there will be a greater chance of an accident and the displayed speed limit will change to a lower speed limit.

Figure 1:
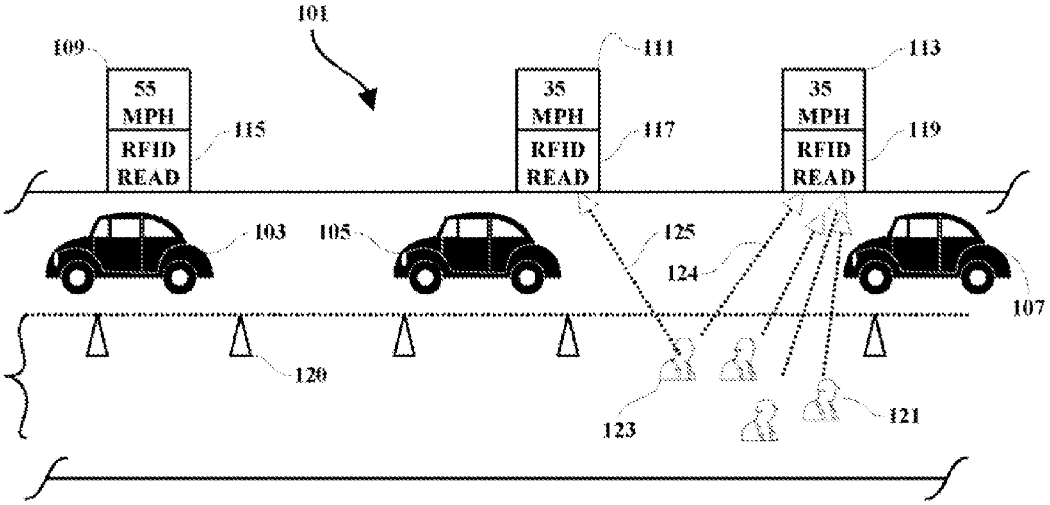
FIG. 1 is an illustration of an exemplary system in which the present invention may be implemented.

With specific reference to the drawings, FIG. 1 shows a highway under construction 101. As vehicles 103, 105 and 107 travel through the construction area defined by the placement of construction cones 120, several electronically-controlled speed limit signs 109, 111 and 113 are viewable by the drivers of the vehicles. In the illustrated example, the speed limit signs 109, 111 and 113 also include Radio Frequency Identification (RFID) detectors or readers 115, 117 and 119 respectively. As shown, construction workers 121 and 123 for example, are working within the construction area. Each of the workers is carrying and RFID device (not shown) or has an RFID device embedded in his or her clothing or helmet, and each RFID device transmits an RFID signal, e.g. 124, 125, to RFID readers, e.g. 119, 117, respectively, in the area.

In operation, when there are workers in the construction area 101, an RFID device worn or carried by each worker transmits RFID signals 125, 125 from each of the workers, and those signals are received by appropriately positioned RFID readers. In the example, the RFID readers 115, 117 and 119 are located together with corresponding speed limit signs 109, 111 and 113. Thus, readers 117 and 119 in the FIG. 1 example receive RFID signals from the workers in the area but reader 115 does not since the workers are out of the reading range of reader 115. As shown, when any of the readers 115, 117 and 119 receive or detect one or more RFID signals from the reading zone covered by the particular reader, then a processing circuit enables the associated electronic speed limit sign 109, 111 and 113 to display a speed limit. Signs 111 and 113 display a speed limit of 35 MPH but sign 109 displays a 55 MPH speed limit since no RFID signals were detected by reader 115. Thus the displayed speed limit is set to a lower speed limit when workers are in the construction area 101 but a normal 55 MPH speed limit is displayed in an area of the construction zone where there are no workers present.

FIG. 2 illustrates the sensing zones covered by the RFID readers. As shown, reader 203 covers an RFID Zone 1 (RZ1) area 201, reader 209 covers RZ2 207 and reader 215 covers area RZ3 213. As shown, the sensed areas overlap somewhat to insure that the entire working area is covered by at least one of the readers. In FIG. 2, workers 219, 221, 223 and 225 are shown and each is transmitting RFID signals from an RFID device on the worker. FIG. 2 illustrates another implementation of the disclosed methodology in which processing circuitry is effective to determine how many different RFID signals are being received by each of the readers. As shown in FIG. 2, reader 215 receives four different RFID signals from workers 219, 221, 223 and 225, while reader 209 receives only one RFID signal from the closest worker 219 to RZ2. Processing circuitry associated with reader 215 is effective to enable the speed limit sign 217 to display a speed limit of only 35 MPH since there are four workers detected to be in the area. Reader 209 detects only a single RFID signal form worker 219 and processing circuitry is effective to cause a speed limit of 45 MPH to be displayed on the second speed limit sign 211. Further, since no RFID signals are detected by reader 203, it is determined that there are no workers in RZ1 201 and therefore a normal or higher speed limit of 55 MPH is displayed on speed limit sign 205 as the speed limit for RZ1 201. Thus, the implementations shown in FIG. 1 and FIG. 2 accomplish the same general result by detecting whether there are any workers in a work zone and adjusting the posted speed limit in that zone accordingly. In the illustrated example, RFID systems are used to determine the presence of workers in a construction zone although other systems for detecting worker presence may also be used to control the displayed speed limit in areas where individuals may be present in close proximity to a highway.

Figure 3:
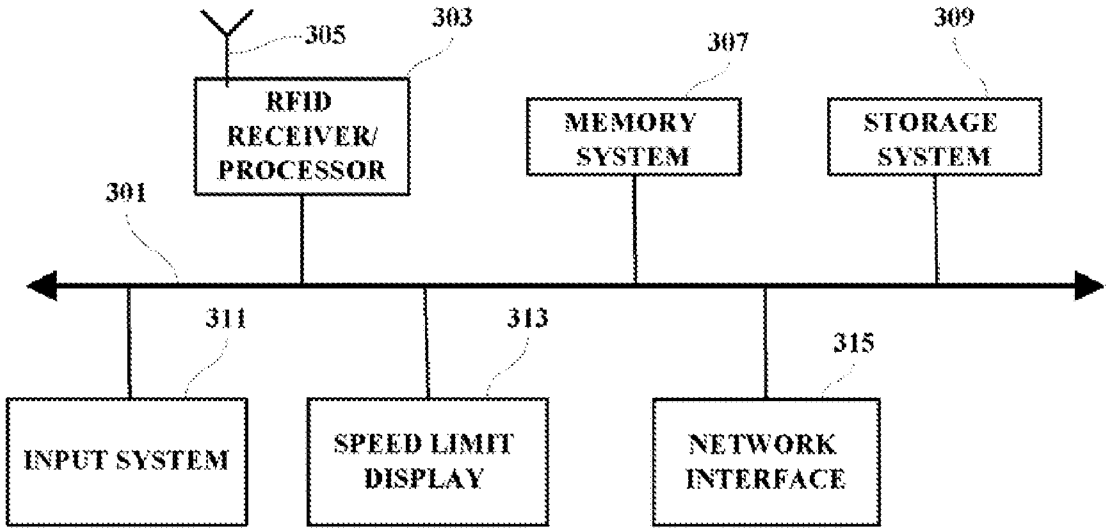
FIG. 3 is a simplified block diagram showing several of the major components of an RFID detection system implemented in accordance with the present invention.

FIG. 3 illustrates one example of a processing device which may be implemented to process detected individual presence in a construction area and provide an appropriate or programmed electronically displayed speed limit. The exemplary processing device shown in FIG. 3 includes a main bus 301 to which is connected an RFID Receiver 303 which is arranged to receive RFID signals through an antenna or receiving device 305. A memory system 307, storage system 309 and input means 311 are also shown coupled to the main bus 301. The speed limit display function 313 is also coupled to the main bus 301 as well as a network interface 315. As hereinbefore noted, RFID signals are received and processed 303 and an speed limit is determined to correspond to the number of workers detected to be in the construction zones. This may be accomplished, for example, by referring to a table stored in memory which includes various numbers of RFID signals which may be detected as well as corresponding speed limits for each number of RFID signals detected. The stored table or database may be created or changed, for example, by using the input system 311 at the speed limit sign near the construction area or by inputting from a remote location through the network interface 315. Thus, for different construction areas, appropriate speed limits may be different for corresponding numbers of workers. Also, the appropriate speed limits for the number of workers in an area may also be changed depending upon the particular weather conditions at the time. Changes due to weather conditions can be input either manually through the input system 311 or through the network interface 315 from a central control site.

Figure 4:
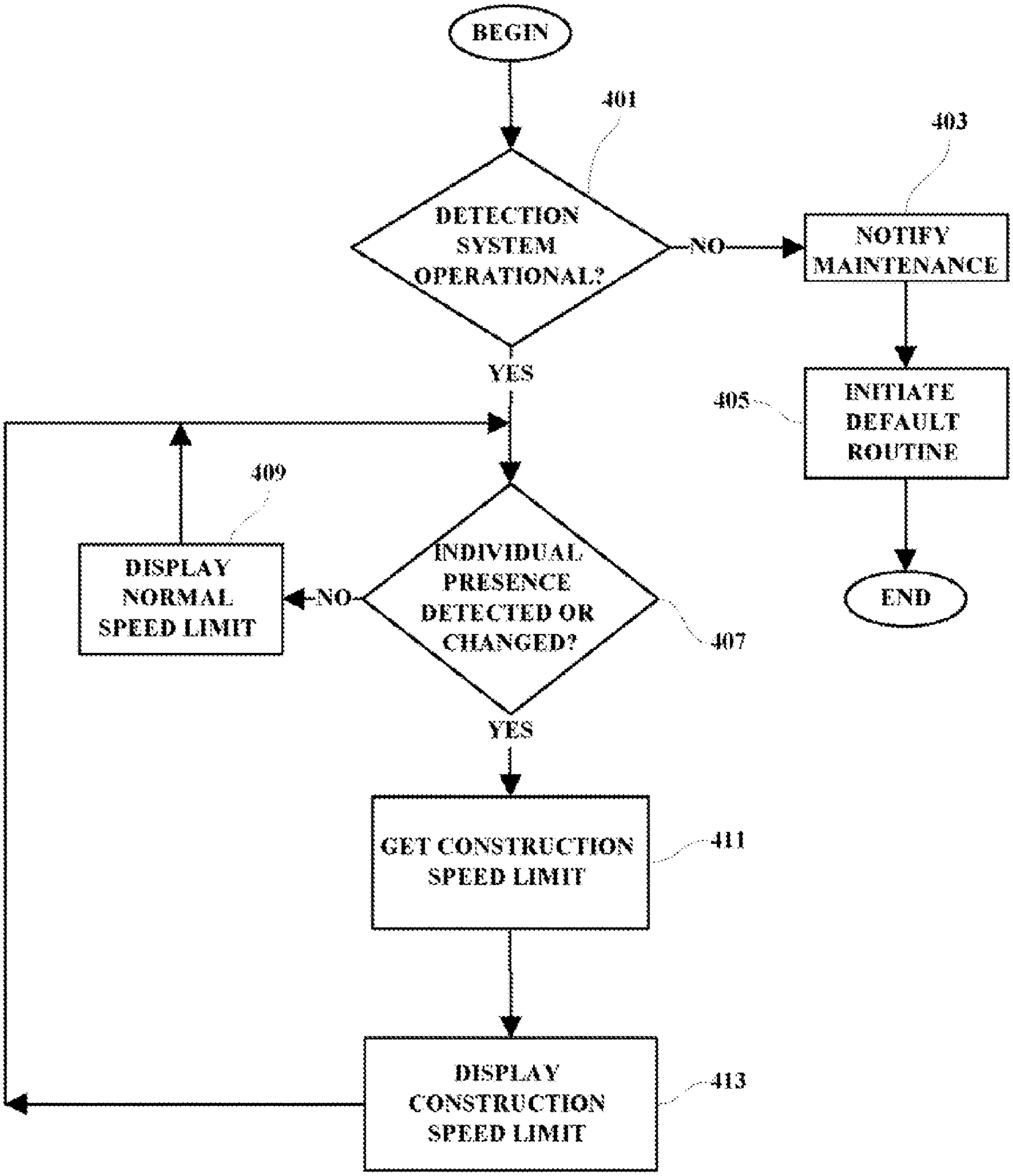
FIG. 4 is a flow chart illustrating an operational sequence of one exemplary embodiment of the present invention.

As shown in FIG. 4, when the system is activated, there may be an initial test 401 to insure that the system is operational. If the system is not operational 401 then maintenance department may be automatically notified 403 and a default routine 405 executed. The default routine may be, for example, to set all of the signs to 35 MPH until the system is again operational. If the system is determined to be operational 401, then readings are taken 407 to determine if there are any individuals present in the construction zones. If no worker presence is detected, a normal speed limit is displayed 409 and the system continues to take readings to determine the presence of individuals. When individuals are detected to be in the area 407, then the number of individuals is stored and a reference table, for example, is accessed 411 to determine an appropriate speed limit for the number of individuals detected to be present and the appropriate speed limit is caused to be displayed 413 on the associated speed limit signs as hereinbefore explained. After the appropriate speed limit is displayed 413, the system continues to check 407 for changes in the number of individuals detected to be present in the construction area and changes the posted speed limit accordingly.

Figure 5:
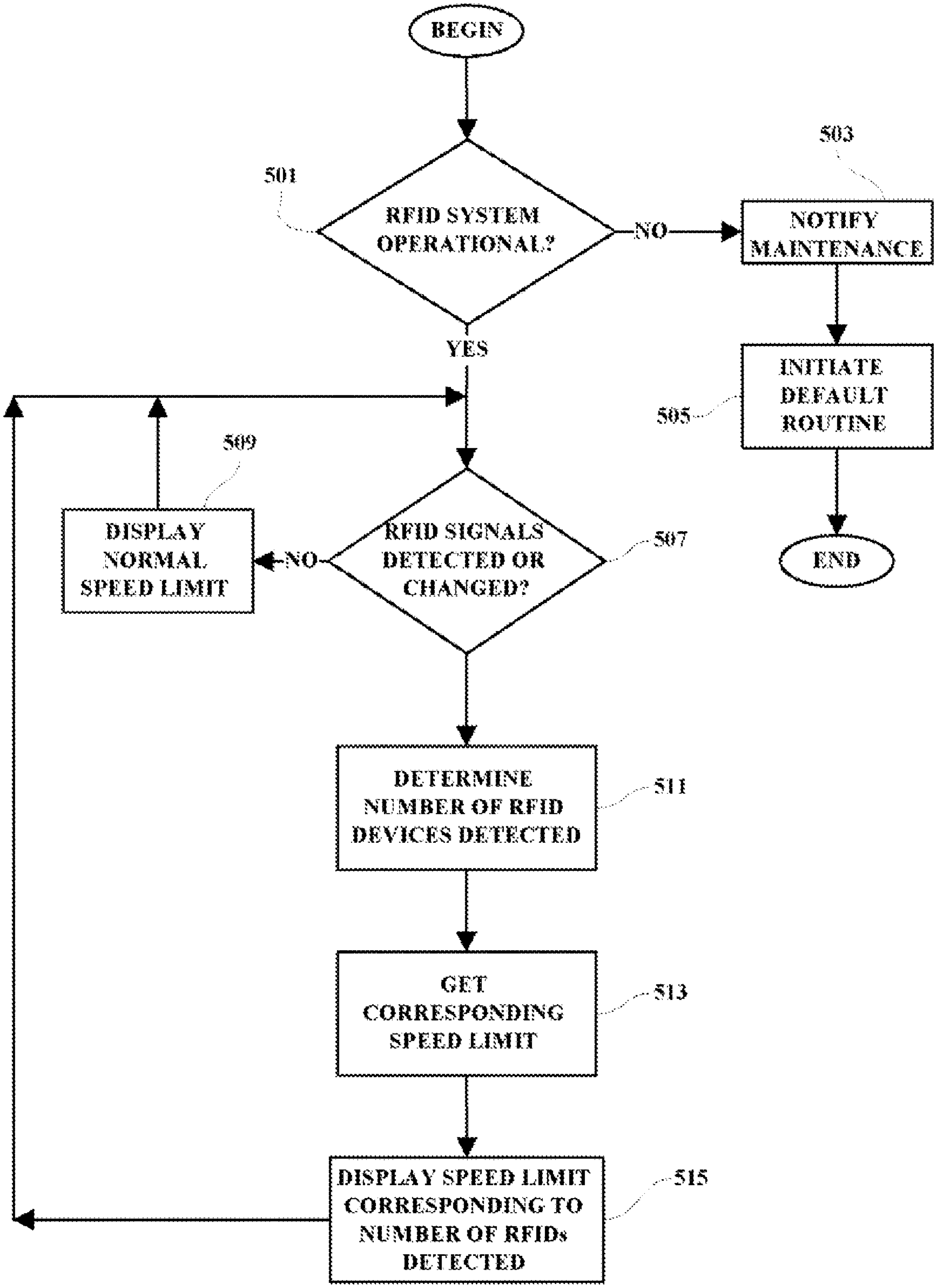
FIG. 5 is a flow chart illustrating an operational sequence of another exemplary embodiment of the present invention.

The flow chart in FIG. 5 corresponds to the example illustrated in FIG. 2. As shown, the RFID system is initially checked to determine if it is operational 501 and if not, appropriate actions are taken 503, 505. If The RFID system checks out to be operational 501, then the RFID readers are checked to determine 507 if any RFID signals have been detected in the various zones of coverage. If a reader detects one or more RFID signals in a covered zone then the number of different RFID devices is determined 511. A look-up table or database is then referenced by the processing circuit to determine 513 a corresponding speed limit for the number of individuals detected to be present. The appropriate speed limit is displayed 515 to correspond to the number of individuals detected to be present and the system returns to continue to monitor for changes in the number of RFID signals received from the covered construction zones.

The method and apparatus of the present invention has been described in connection with a preferred embodiment as disclosed herein. The disclosed methodology may be implemented in a wide range of sequences, and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely or partially in program code stored in any media, including portable or fixed, volatile or non-volatile memory media device, including CDs, RAM and "Flash" memory, or other semiconductor, optical, magnetic or other memory storage media from which it may be loaded and/or transmitted into other media and executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for controlling an electronically displayed vehicle speed limit, said method comprising:

detecting a presence of an individual within a predetermined area near a roadway; and controlling a display of said vehicle speed limit along said roadway in response to said detecting of a presence of an individual within said predetermined area, wherein said detecting is accomplished by using a radio frequency identification (RFID) system.

2. The method as set forth in claim 1 wherein said individual within said predetermined area has an RFID device, said RFID device being enabled to transmit RFID signals within said predetermined area, said detecting being accomplished by reading said RFID signals by an RFID reading device, said RFID reading device being enabled to read said RFID signals transmitted within said predetermined area.

3. The method as set forth in claim 2 and further including a plurality of RFID reading devices placed sequentially along said roadway, each of said RFID reading devices being enabled to independently read said RFID signals within corresponding sequential sections of said predetermined area.

4. The method as set forth in claim 1 wherein said controlling includes displaying a first speed limit when no individuals are detected as being present within said predetermined area, and displaying a speed limit lower than said first speed limit when one or more individuals are detected as being present within said predetermined area.

5. The method as set forth in claim 1 and further including determining a specific number of individuals present within said predetermined area wherein said controlling includes displaying a first speed limit when no individuals are detected as being present within said predetermined area, and displaying a second speed limit when one or more individuals are detected as being present within said predetermined area, said second speed limit being determined depending upon said specific number of individuals detected as being present within said predetermined area.

6. A storage medium including machine readable coded indicia, said storage medium being selectively coupled to processing circuitry within a computer system, said processing circuitry being operable in response to a reading of said machine readable coded indicia, for controlling an electronically displayed vehicle speed limit by effecting the steps of:

enabling a detecting of a presence of one or more individuals within a predetermined area near a roadway; and controlling a display of said vehicle speed limit along said roadway in response to said detecting of a presence of one or more individuals within said predetermined area, said vehicle speed limit being incrementally changed depending upon a number of said individuals detected and/or a proximity of said individuals to said roadway.

7. The medium as set forth in claim 6 wherein said detecting is accomplished by using a radio frequency identification (RFID) system.

8. The medium as set forth in claim 7 wherein said individual within said predetermined area has an RFID device, said RFID device being enabled to transmit RFID signals within said predetermined area, said detecting being accomplished by reading said RFID signals by an RFID reading device, said RFID reading device being enabled to read said RFID signals transmitted within said predetermined area.

9. The medium as set forth in claim 8 and further including a plurality of RFID reading devices placed sequentially along said roadway, each of said RFID reading devices being enabled to independently read said RFID signals within corresponding sequential sections of said predetermined area.

10. The medium as set forth in claim 6 wherein said controlling includes displaying a first speed limit when no individuals are detected as being present within said predetermined area, and displaying a speed limit lower than said first speed limit when one or more individuals are detected as being present within said predetermined area.

11. The medium as set forth in claim 6 and further including determining a specific number of individuals present within said predetermined area wherein said controlling includes displaying a first speed limit when no individuals are detected as being present within said predetermined area, and displaying a second speed limit when one or more individuals are detected as being present within said predetermined area, said second speed limit being determined depending upon said specific number of individuals detected as being present within said predetermined area.

12. A system for controlling an electronically displayed vehicle speed limit, said system comprising:

means for detecting a presence of one or more individuals within a predetermined area near a roadway; and means for controlling a display of said vehicle speed limit along said roadway in response to said detecting of a presence of said one or more individuals within said predetermined area, said detecting being accomplished by receiving signals transmitted from devices carried by said one or more individuals.

13. The system as set forth in claim 12 wherein said detecting is accomplished by using a radio frequency identification (RFID) system.

14. The system as set forth in claim 13 wherein said one or more individuals within said predetermined area is carrying an RFID device, said RFID device being enabled to transmit RFID signals within said predetermined area, said detecting being accomplished by an RFID reading device arranged for reading said RFID signals, said RFID reading device being enabled to read said RFID signals transmitted within said predetermined area.

15. The system as set forth in claim 14 and further including a plurality of RFID reading devices placed sequentially along said roadway, each of said RFID reading devices being enabled to independently read said RFID signals within corresponding sequential sections of said predetermined area.

16. The system as set forth in claim 12 wherein said means for controlling includes display means for displaying a first speed limit when no individuals are detected as being present within said predetermined area, said display means being operable for displaying a speed limit lower than said first speed limit when one or more individuals are detected as being present within said predetermined area.

17. The system as set forth in claim 12 and further including means for determining a specific number of individuals present within said predetermined area wherein said means for controlling includes a display means for displaying a first speed limit when no individuals are detected as being present within said predetermined area, and displaying a second speed limit when one or more individuals are detected as being present within said predetermined area, said second speed limit being determined depending upon said specific number of individuals detected as being present within said predetermined area.

* * * * *